US006344702B1

(12) United States Patent
Rodriguez et al.

(10) Patent No.: US 6,344,702 B1
(45) Date of Patent: Feb. 5, 2002

(54) SIMPLIFIED TORQUE MOTOR

(75) Inventors: Mario A. Rodriguez, Camarillo; Ori D. Chen-Zion, West Hills, both of CA (US)

(73) Assignee: HR Textron, Inc., Valencia, CA (US)

( * ) Notice: Subject to any disclaimer, the term of this patent is extended or adjusted under 35 U.S.C. 154(b) by 14 days.

(21) Appl. No.: 09/593,055

(22) Filed: Jun. 13, 2000

(51) Int. Cl.$^{7}$ .......................... H02K 15/00; F16B 5/00; H01F 7/08

(52) U.S. Cl. ............................ 310/42; 29/596; 137/83; 251/129.18; 335/238; 335/258

(58) Field of Search ................................ 239/583, 584, 239/585.1; 137/83, 625.63, 625.64; 251/129.01, 129.09, 129.1, 129.15, 129.16, 129.18; 29/596; 310/42; 335/220, 229, 238, 255, 256, 258, 266, 281

(56) References Cited

U.S. PATENT DOCUMENTS

| | | | | |
|---|---|---|---|---|
| 3,381,150 A | | 4/1968 | Trbovich et al. | 310/29 |
| 3,437,101 A | | 4/1969 | Coakely et al. | 137/83 |
| 3,473,547 A | | 10/1969 | Coakley | 137/83 |
| 3,612,103 A | | 10/1971 | Waddington | 137/625.63 |
| 3,678,951 A | | 7/1972 | Coakley | 137/14 |
| 4,201,116 A | | 5/1980 | Martin | 91/387 |
| 4,245,789 A | * | 1/1981 | Gray | 239/585.2 |
| 4,293,835 A | * | 10/1981 | Davis et al. | 335/131 |
| 4,378,031 A | | 3/1983 | Nicholson et al. | 137/625.63 |
| 4,442,855 A | | 4/1984 | Hoffman, Jr. et al. | 137/83 |
| 4,463,332 A | | 7/1984 | Everett | 335/258 |
| 5,295,627 A | | 3/1994 | Wahba | 239/585.4 |
| 5,473,298 A | | 12/1995 | Teutsch | 325/237 |
| 5,679,989 A | | 10/1997 | Buscher et al. | 310/42 |
| 5,692,463 A | | 12/1997 | Liang et al. | 123/90.11 |

* cited by examiner

*Primary Examiner*—Burton S. Mullins
(74) *Attorney, Agent, or Firm*—Fulbright & Jaworski L.L.P.

(57) ABSTRACT

A simplified torque motor which includes a plurality of parts defining appropriate alignment slots and grooves as well as openings for properly positioning the parts with respect to each other so that after being secured by appropriate fasteners, the torque motor may function as a first stage for the control of fluid through an appropriate valve. The various parts include a base carrying an armature, upper and lower pole pieces, permanent magnets, electromagnetic coils and shims disposed between the base and the lower pole piece to adjust the air gap between the poles of the upper and lower pole pieces. The shims are provided with appropriate slits to receive a tool for easy removal of the shim for air gap adjustment purposes.

9 Claims, 3 Drawing Sheets

FIG. 2
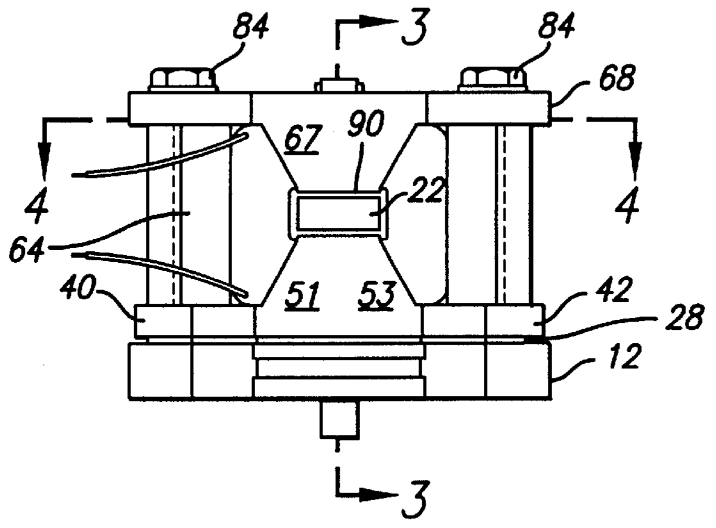
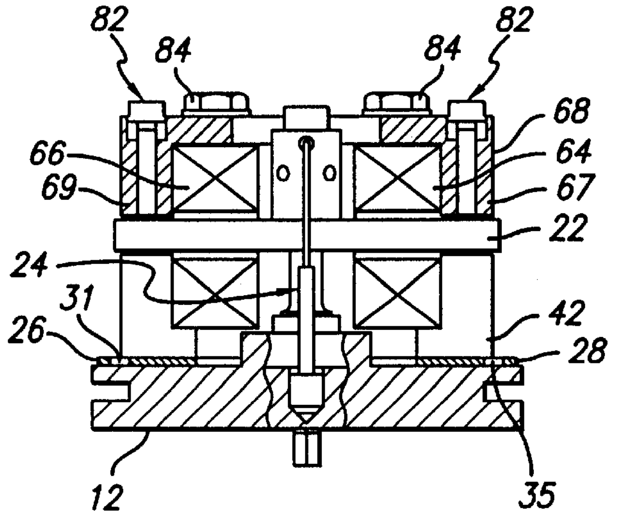
FIG. 4
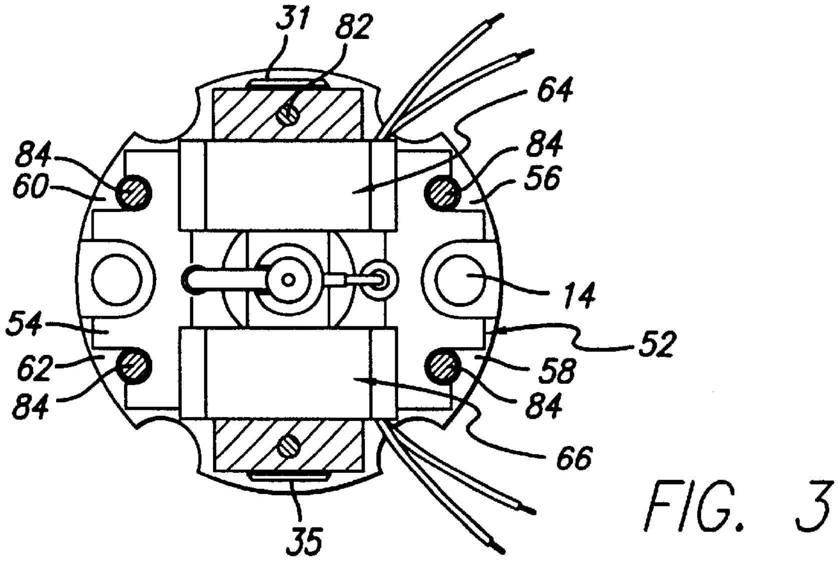
FIG. 3

FIG. 5
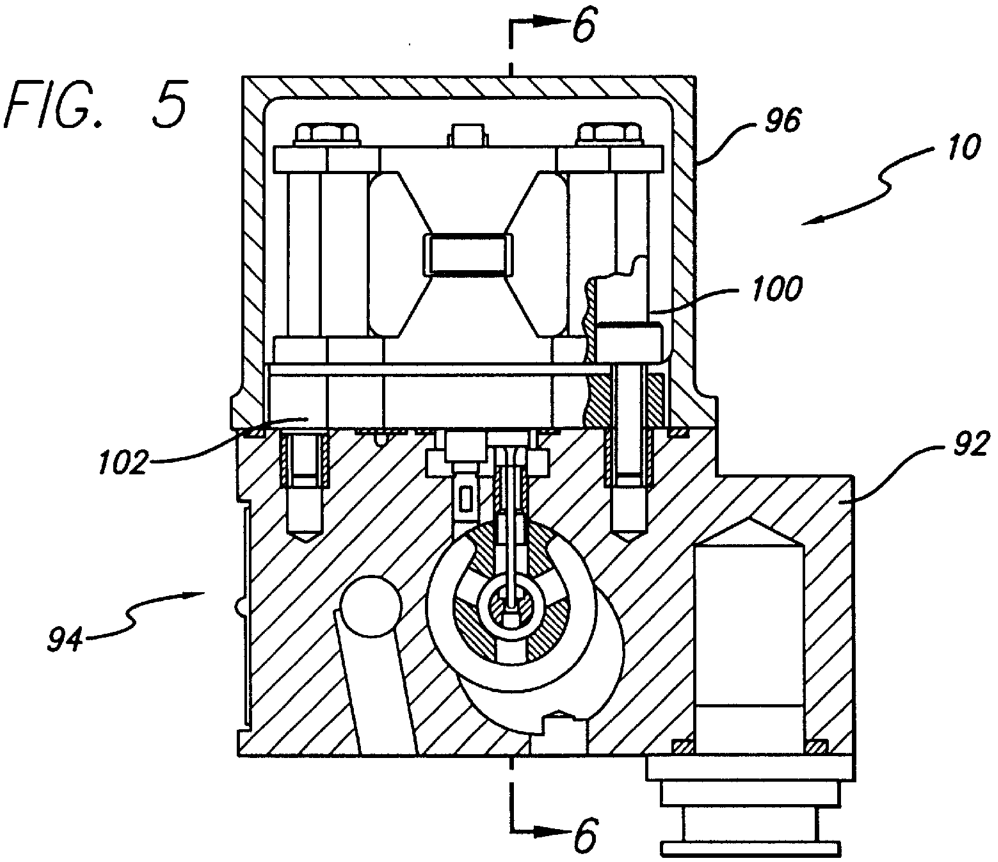
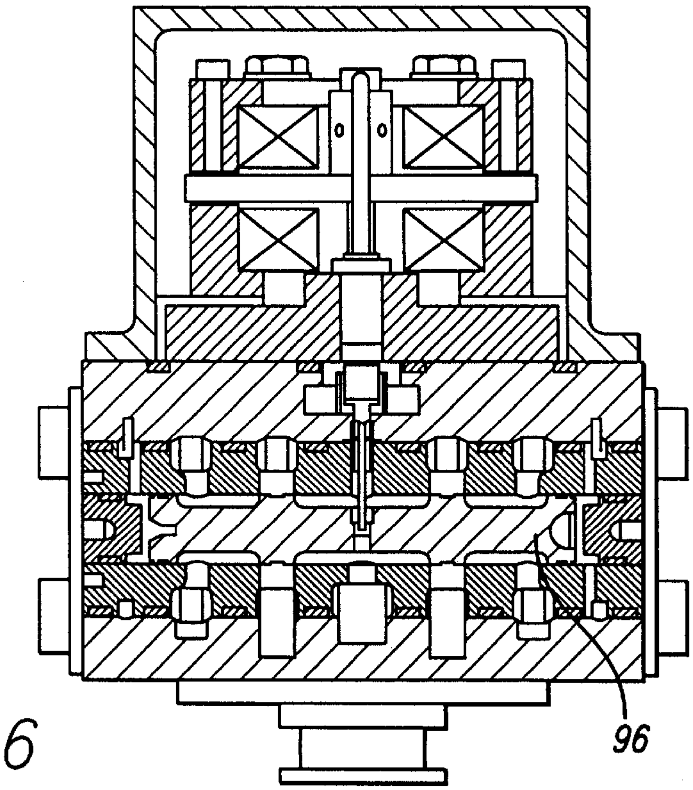
FIG. 6

SIMPLIFIED TORQUE MOTOR

FIELD OF THE INVENTION

This invention relates generally to electrical magnetic actuators and more specifically to torque motors which may be utilized in the pilot stages of electro-hydraulic or electro-pneumatic valves.

BACKGROUND OF THE INVENTION

Torque motors are well known in the prior art relating to electro-hydraulic servo-valves as well as to other types of valves used in the direct drive or pneumatic field. Typically, such torque motors are constructed from a pair of pole pieces, an armature, flexural or pivoting means to locate the armature within the torque motor structure, a pair of coils, a pair of magnets and a motor housing. Such torque motors are useful in operating valves and controlling fluid flow of various types and may also be utilized in other applications as well.

In many of the applications involving torque motors, stability and reliability of operation is critical. The ability to operate in extreme temperature cycling conditions of a repetitive nature is also critical as is the resistence to vibration.

Various efforts have been exerted to provide torque motors having the desired reliability and stability and to obtain the operational characteristics as above described. Such techniques as filling spaces in between certain operational components of the torque motor with polymeric fillers, utilizing adhesive materials to retain parts in proper operational position and clamping components together utilizing various structures exerting inwardly directed compressive forces or the like have been utilized. Typical of such structures are those shown in prior art U.S. Pat. Nos. 5,473,298 and 5,679,989. While such structures operate relatively well, they require a large number of parts and once assembled and placed into operation cannot be readily maintained or repaired without complete disassembly and in many instances are difficult to adjust at the time of manufacture to provide the required operational stability.

SUMMARY OF THE INVENTION

In accordance with the present invention, there is provided a torque motor having a base, upper and lower pole pieces, first and second permanent magnets disposed between the pole pieces, a pair of electromagnetic coils positioned about the ends of an armature carried by the base and a pair of shims sandwiched between the lower pole piece and the base. Each of the base and pole pieces define openings therethrough while the shims and the pole pieces define slots or grooves therein. The holes, slots and grooves are aligned with each other and a plurality of fasteners are positioned through the openings, slots and grooves and are threaded into openings provided in the base. After the component parts are properly adjusted to provide mechanical and magnetic null, the fasteners are secured to maintain the components of the torque motor in properly aligned operational position.

BRIEF DESCRIPTION OF THE DRAWINGS

FIG. 2 is a front elevational view of the torque motor shown in its assembled form;

FIG. 3 is a partial cross-sectional view of the assembled torque motor of FIG. 2 taken about the lines 3—3 thereof;

FIG. 4 is a partial cross-sectional view of the torque motor of FIG. 2 taken about the lines 4—4 thereof;

FIG. 5 is a cross-sectional view of a torque motor constructed in accordance with the present invention assembled upon the housing of an electro-hydraulic servo-valve; and FIG. 6 is a cross-sectional view of the torque motor and valve of FIG. 5 taken about he lines 6—6 thereof.

DETAILED DESCRIPTION

Figure 1:
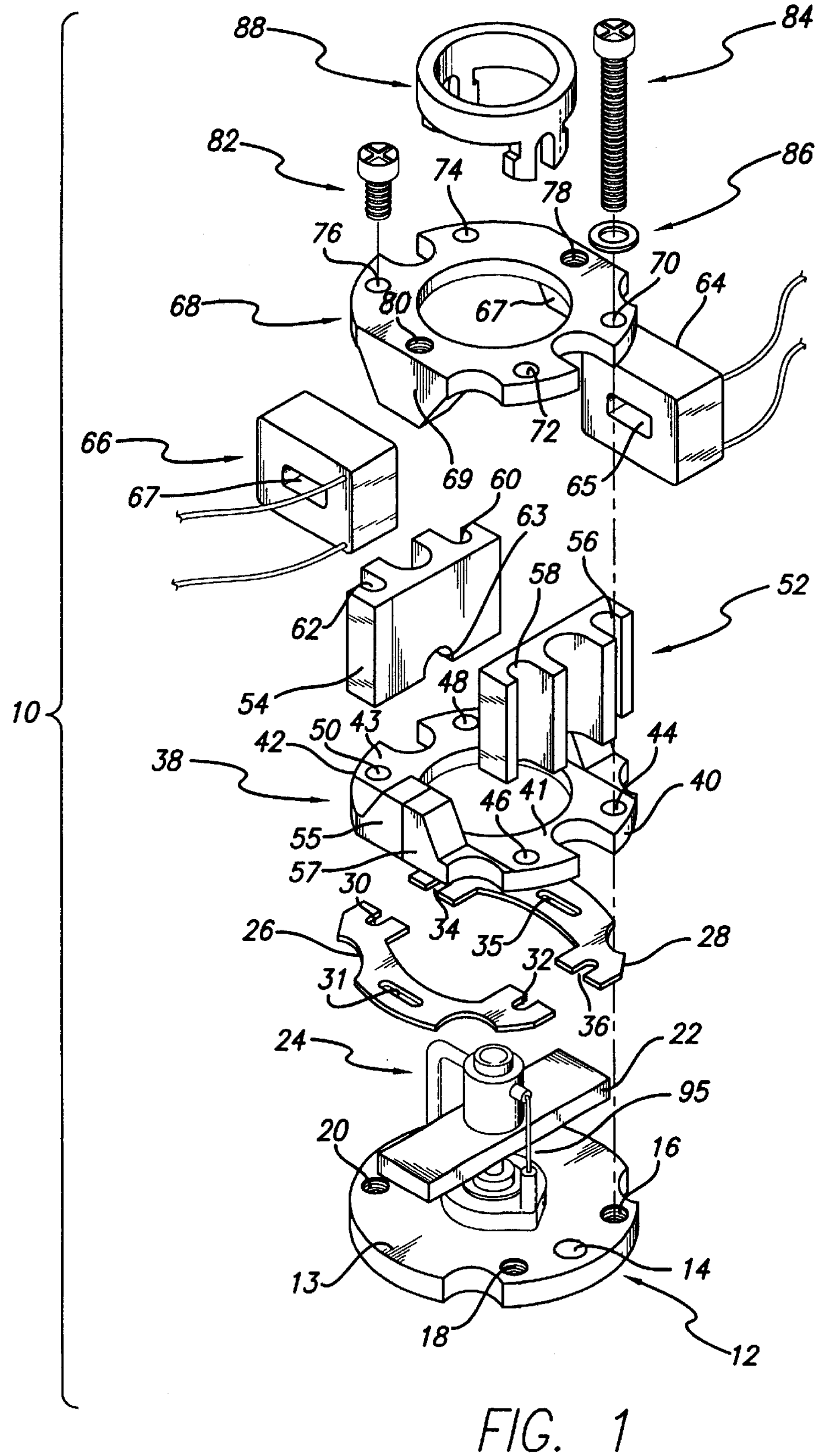
FIG. 1 is an exploded view illustrating the various components of a torque motor constructed in accordance with the principles of the present invention.

Referring now to the drawings and more particularly to FIG. 1, there is therein illustrated a torque motor 10 constructed in accordance with the principles of the present invention and shown in exploded fashion so that the various component parts may be more easily viewed and understood. As is therein shown, the torque motor 10 includes a base 12 which defines a plurality of openings 14, 16, 18, 20 and one additional opening (not shown) which is diametrically opposed to the opening 18 as well as an additional opening (not shown) diametrically opposed to the opening 14. The openings 16, 18, 20 and the one diametrically opposed to the opening 18 are threaded for the purpose of receiving a fastener as will be described more fully below. The base 12 carries an armature 22 which is a portion of a jet pipe assembly 24. Jet pipe assemblies for use particularly in electro-hydraulic servo-valves are old and well known in the prior art. For example, those illustrated in U.S. Pat. Nos. 5,679,989 and 5,473,298 above referred to and the disclosures thereof are incorporated herein by this reference. Therefore, more detailed description of the jet pipe assembly will not be provided herein since those skilled in the art will have adequate knowledge of the construction and function of such an assembly. Although a jet pipe assembly is illustrated as a portion of the detailed illustrations and drawings in this application, it is to be expressly understood that the torque motor of the present invention may be utilized in other applications as well. Such for example, as a flapper-nozzle structure, direct drive valve, pneumatic valve, or the like.

A pair of shims 26 and 28 are disposed upon the upper surface 13 of the base 12. The shim 26 defines a pair of slots 32 and 30 and a through opening or slit 31 while the shim 28 defines a pair of slots 34 and 36 and a through opening or slit 35. As will be described more fully below, the slots 30 through 36 and the slits 31 and 35 are provided to allow easy removal of the shims 26 and 28 from the assembled torque motor during appropriate adjustment thereof and easy substitution of other shims of differing thicknesses in order to provide the desired operational characteristics and stability of the torque motor of the present invention.

A lower pole piece shown generally at 38 is disposed upon the shims 26 and 28. Alternatively, this portion of the structure may be viewed as having the shims 26 and 28 sandwiched between the lower pole piece 38 and the upper surface 13 of the base 12. As is shown in FIG. 1, the lower pole piece 38 includes a first section 40 and a second section 42 which are constructed as separate and distinct split apart members. Such construction provides easy assembly of the pole piece 38 upon the base 12 even after it is manufactured as a unit carrying the armature 22 and the jet pipe assembly 24. It will be well understood by those skilled in the art that if the lower pole piece 38 is made as a single member, the pole piece would have to be assembled upon the base 12 prior to the assembly of the jet pipe assembly and the armature upon the base 12. Such would require a much more difficult and expensive assembly process and therefore the structure of the present invention having the lower pole piece formed of separate and distinct split apart sections simplifies the assembly and buildup of the torque motor. The first section 40 of the lower pole piece 38 defines a pair of openings 44 and 46 therethrough while the second section 42 of the lower pole piece 38 defines openings 48 and 50 therethrough.

A first permanent magnet 52 is carried by an upper surface 41 of the first section 40 of the lower pole piece 38 while a second permanent magnet 54 is carried by the upper surface 43 of the second section 42 of the lower pole piece 38. The permanent magnet 52 defines a pair of grooves 56 and 58 while the permanent magnet 54 defines a pair of grooves 60 and 62 and an opening 63. A similar opening (not shown) is provided in the permanent magnet 52. The grooves 56 through 62 are formed on the outer surfaces of the permanent magnets 52 and 54. The purpose of the grooves and the openings will become apparent from the description set forth below.

A pair of coils 64 and 66 are provided and are disposed so that the opposite ends of the armature 22 extend through the openings 65 and 67 provided in the coils 64 and 66, respectively. The lower surfaces of the coils 64 and 66 are also received upon the upper surfaces 41 and 43 of the lower pole piece 38 first and second split apart sections 40 and 42, respectively.

An upper pole piece 68 defining a plurality of openings 70 through 80 is provided. The openings 78 and 80 are threaded to receive armature adjusting screws 82 (only one of which is illustrated). The armature adjusting screws extend through the upper poles 67 and 69 and extend therebelow by a small amount to control the amount of movement of the armature 22 in response to electrical signals applied to the coils 64 and 66. If desired, a coil retainer 88 may be utilized to assist in maintaining the coils 64 and 66 in place internally within the torque motor structure.

By reference now to FIGS. 2 through 4, there is illustrated in various views the torque motor as illustrated in FIG. 1 in exploded form in its assembled form. By reference particularly to FIG. 2, it is shown that the poles formed by the upper and lower pole pieces when brought together adjacent the armature 22 provide a working air gap such as illustrated at 90 formed by the pole 67 opposing the pole formed by the upwardly extending portions 51, 53 of the pole piece sections 40 and 42 of the lower pole piece 38. As is well known to those skilled in the art, when an electrical signal is applied for example to the coils 64 and 66 the magnetic forces generated will cause the armature 22 to deflect within the air gap 90. Such deflection provides an appropriate output signal through functioning of the jet pipe first stage as above described. As shown in FIG. 3, the adjusting screws 82 extend below the lower surfaces of the poles 67 and 69 so that the amount of deflection of the armature can be adjusted and controlled by extending the screws 82 further into the air gap 90 or retracting them further out of the air gap as the case may be.

By consideration of the illustrations shown in FIGS. 1 through 4, the method of manufacturing the torque motor constructed in accordance with the principles of the present invention will be more fully understood. In the method of manufacturing, the magnetic coils 64 and 66 are first positioned upon the opposite ends of the armature 22. Thereafter, the sections 40 and 42 of the lower pole piece 38 are inserted in position between the coils and the top surface 13 of the base 12. The magnets 52 and 54 are then placed in position upon the top surface 41 of the section 40 and the top surface 43 of the section 42 of the lower pole piece 38. Subsequently, the upper pole piece 68 is positioned on top of the first and second magnets. In order to facilitate assembly of the parts as just described the permanent magnets 52 and 54 are pre-charged prior to the assembly operation. The magnets 52 and 54 being pre-charged assist in holding the various piece parts together as they are assembled one upon the other.

After the piece parts are thus assembled, the first and second shims are inserted between the upper surface 13 of the base 14 and the lower pole piece 38.

It should now be recognized that after the shims, upper and lower pole pieces, coils and magnets are assembled upon the base carrying the jet pipe assembly, the openings, slots and grooves are properly aligned to receive the fasteners 84. For example, the opening 70 is aligned with the groove 56 which is aligned with the opening 44 which is aligned with the slot 36 which in turn is aligned with the threaded opening 16 in the base 12. The screw 84 with the washer appropriately positioned with respect thereto is then inserted through the aligned openings, slots and grooves and is threadably received within the threaded opening 16. A similar operation is accomplished at each of the other four corners thus aligning and positioning all of the parts operatively one with respect to the other. Appropriate spacing is then accomplished between the faces of the poles such for example at 69 and 55/67 (FIG. 1) to form the desired air gap 90 for operations according to the particular application involved. If the air gap is found to be too small or too large, the shims 26 and 28 may be easily removed because of the slots 30–36 formed therein, by inserting a tool or finger nail in the slits 31 or 35, without disassembling the structure. Likewise, new shims may be inserted to obtain the desired spacing between the poles to provide the desired air gap, since the slots 30–36 allow the shims to be easily inserted into the structure. When such has been accomplished and the armature 22 is positioned properly to achieve magnetic null, the fasteners 84 are then securely engaged and locked in place on the base 12 thus completing the assembly of the torque motor in accordance with the principles of the present invention. In the event that a minor adjustment is needed after appropriate testing, a tool may be inserted through the opening 63 in the magnet and the wire 95 of the jet pipe assembly 24 may be slightly bent as opposed to replacing a shim.

By reference now to FIGS. 5 and 6, the assembled torque motor 10 is shown positioned upon a housing 92 of the second stage 94 of an electro-hydraulic servo-valve which controls the flow of fluid from a source (not shown) to a load (not shown) by movement of an appropriate spool 96 reciprocally disposed within the housing 92. Again, this operation is well known to those skilled in the art and will not be more fully described herein. As is illustrated particularly in FIG. 5, appropriate fasteners 100 and 102 are used to secure the torque motor 10 to the housing 92 by passing through the opening 14 and the opening diametrically opposed to 14 on the base 12 (FIG. 4). An appropriate cover 96 is positioned over the torque motor 10 and secured in place on the housing 92 as is well known to those skilled in the art. It will also be appreciated by those skilled in the art that after the torque motor 10 is positioned upon the housing 92, it may be moved slightly in order to accomplish a matching of the hydraulic and magnetic nulls for the valves before tightening the fasteners 100.

It will be recognized by those skilled in the art that through the construction of the torque motor and its positioning upon the housing of an appropriate valve in accordance with the principles as above described, there is provided a torque motor having substantially less parts than torque motors of similar application in the past and provides a structure whereby maintenance of the torque motor can easily be accomplished without full disassembly thereof and if desired, disassembly is relatively easy to accomplish and the replacement of various component parts may be readily accomplished as compared to prior art torque motors.

What is claimed is:

1. A torque motor for use with a valve having a housing, said torque motor comprising:

a base carrying an armature having first and second ends and defining a first plurality of openings therein;

a lower pole piece including first and second split apart sections thereof defining a second plurality of openings therethrough disposed upon said base;

first and second shims sandwiched between said lower pole piece and said base, each of said shims defining a pair of slots therein;

an upper pole piece defining a third plurality of openings therethrough;

first and second permanent magnets disposed between said lower and upper pole pieces spacing them apart to define first and second air gaps between poles thereon within which said first and second ends of said armature are disposed, each of said magnets defining a pair of grooves therein;

first and second electromagnetic coils positioned about said first and second ends of said armature respectively;

said first, second and third plurality of openings and said slots and grooves all being aligned; and a plurality of fasteners extending through said openings, slots and grooves and being threadably received within predetermined threaded ones of said first plurality of openings for clamping said pole pieces, base and magnets together.

2. A torque motor as defined in claim 1 wherein said first and second magnetic coils are carried by said lower pole piece split apart sections.

3. A torque motor as defined in claim 1 wherein said first and second permanent magnets are carried by said lower pole piece split apart sections.

4. A torque motor as defined in claim 1 wherein each of said shims define a slit therethrough which, when said motor is assembled, is exposed to facilitate removal of said shim.

5. A method of manufacturing a torque motor comprising:

providing a base carrying an armature having first and second ends and defining a first plurality of openings therethrough;

providing a lower pole piece including first and second split apart sections and defining a second plurality of openings therethrough;

providing first and second shims each defining a pair of slots therein;

providing first and second electromagnetic coils;

providing first and second permanent magnets defining grooves therein;

positioning said first and second coils around said first and second ends of said armature;

sliding said first and second split apart sections of said lower pole piece between said coils and said base;

positioning said first and second magnets on said first and second sections respectively of said lower pole piece;

positioning said upper pole piece on said first and second magnets;

inserting said first and second shims between said base and said lower pole piece;

aligning said grooves and slots with predetermined ones of said first, second and third plurality of openings;

providing a plurality of fasteners;

inserting said fasteners through predetermined ones of said openings, said grooves and said slots; and securing said fasteners to said base.

6. The method of claim 5 which further includes physically aligning said pole pieces, magnets and shims to provide symmetry thereof on said base before the step of securing said fasteners.

7. The method of claim 6 which further includes the steps of testing said motor to ascertain the magnetic null thereof and substituting different shims to adjust spacing between the armature and pole pieces.

8. The method of claim 6 which further includes providing armature adjusting screws and threadably positioning said adjusting screws in said upper pole piece to limit the travel of said armature.

9. The method of claim 5 which includes the further step of charging said permanent magnets prior to positioning said magnets on said lower pole piece.

* * * * *